United States Patent
Fushman et al.

(10) Patent No.: US 9,130,922 B2
(45) Date of Patent: Sep. 8, 2015

(54) USING A SESSION CONTINUITY TOKEN TO ACCESS AN ONLINE CONTENT MANAGEMENT SYSTEM

(71) Applicant: Dropbox, Inc., San Francisco, CA (US)

(72) Inventors: Ilya Fushman, Palo Alto, CA (US); Sean Lynch, San Francisco, CA (US)

(73) Assignee: DROPBOX, INC., San Francisco, CA (US)

(*) Notice: Subject to any disclaimer, the term of this patent is extended or adjusted under 35 U.S.C. 154(b) by 49 days.

(21) Appl. No.: 13/898,873

(22) Filed: May 21, 2013

(65) Prior Publication Data

US 2014/0165156 A1 Jun. 12, 2014

(51) Int. Cl.
*H04L 29/06* (2006.01)
*G06F 21/31* (2013.01)

(52) U.S. Cl.
CPC ............... *H04L 63/08* (2013.01); *G06F 21/31* (2013.01); *H04L 63/0815* (2013.01); *H04L 65/1083* (2013.01); *H04L 65/4084* (2013.01)

(58) Field of Classification Search
CPC ...... H04L 63/08; H04L 63/0815; G06F 21/41
USPC ....................................................... 726/4, 8
See application file for complete search history.

(56) References Cited

U.S. PATENT DOCUMENTS

| | | | |
|---|---|---|---|
| 2006/0069687 A1 | 3/2006 | Cui | |
| 2006/0218630 A1* | 9/2006 | Pearson et al. | 726/8 |
| 2007/0005961 A1* | 1/2007 | Hamblin et al. | 713/167 |
| 2008/0021997 A1* | 1/2008 | Hinton | 709/225 |
| 2011/0219105 A1 | 9/2011 | Kryze | |
| 2012/0210379 A1 | 8/2012 | McCoy | |
| 2013/0047263 A1* | 2/2013 | Radhakrishnan | 726/27 |

OTHER PUBLICATIONS

OneLogin, Single Sign-On, Jul. 22, 2012, www.onelogin.com.*
Paolo Bellavista, "SIP-Based Proactive Handoff Management for Session Continuity in the Wireless Internet", Proceedings of the 26th IEEE International Conference on Distributed Computing Systems Workshops, 0-7695-2541-5, 2006.

* cited by examiner

*Primary Examiner* — Dao Ho
(74) *Attorney, Agent, or Firm* — Park, Vaughan, Fleming & Dowler LLP

(57) ABSTRACT

The disclosed embodiments relate to a session continuity feature that allows a user to access an online content management system through different instances of a third-party application located on different computing devices without having to log in to the online content management system separately from each computing device. When the user signs on to the online content management system, the session continuity mechanism provides a session continuity token to the third-party system. When the user subsequently accesses an instance of the third-party application located on another computing device, the third-party system provides the session continuity token to the new instance of the third-party application. This enables the user to access the online content management system through the new instance of the third-party application without having to sign on again.

24 Claims, 3 Drawing Sheets

USING A SESSION CONTINUITY TOKEN TO ACCESS AN ONLINE CONTENT MANAGEMENT SYSTEM

RELATED APPLICATION

This claims priority under 35 U.S.C. §119 to U.S. Provisional Patent Application No. 61/735,543, filed on 10 Dec. 2012, entitled "USING A SESSION CONTINUITY TOKEN TO ACCESS A CLOUD-BASED CONTENT MANAGEMENT SYSTEM."

BACKGROUND

1. Field

The disclosed embodiments generally relate to techniques for accessing an online content management system. More specifically, the disclosed embodiments relate to a technique for enabling a user to access an online content management system from different instances of a third-party application located on different computing devices without having to sign on separately from each computing device.

2. Related Art

Online content management systems such as the Dropbox™ service, which is offered by Dropbox, Inc., of San Francisco, Calif., are quite popular because they enable users to access their online content from a number of different computing devices. Unfortunately, the process of accessing the online content management system can be complicated if the user tries to access the online content management system through a third-party application, such as an email system. In this case, the user has to sign on to the online content management system from each instance of the third-party application.

For example, suppose a user is accessing a online content management system through a first email client located on a first device. If the user switches to a second computing device and subsequently attempts to access the online content management system through a second email client on the second device, the user needs to sign on to the online content management system again from second email client, even though the user has already signed on to the online content management system through the first email client.

This process of signing on to the online content management system from each instance of the third-party application is time-consuming and cumbersome.

SUMMARY

The disclosed embodiments relate to a session continuity feature that allows a user to access an online content management system through different instances of a third-party application located on different computing devices without having to log in to the online content management system separately from each computing device. When the user signs on to the online content management system, the session continuity mechanism provides a session continuity token to the third-party system. When the user subsequently accesses an instance of the third-party application located on another computing device, the third-party system provides the session continuity token to the new instance of the third-party application. This enables the user to access the online content management system through the new instance of the third-party application without having to sign on again.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to a technique for enabling a user to access an online content management system from different instances of a third-party application located on different computing devices without having to sign on separately from each computing device. Before describing details of this system, we first describe the basic structure of the online content management system.

Note that the description herein refers to "content items." Content items may generally include any type of files, folders, collection of folders, or data that may be stored on a computer-readable storage medium.

Content Management Environment

Figure 1:
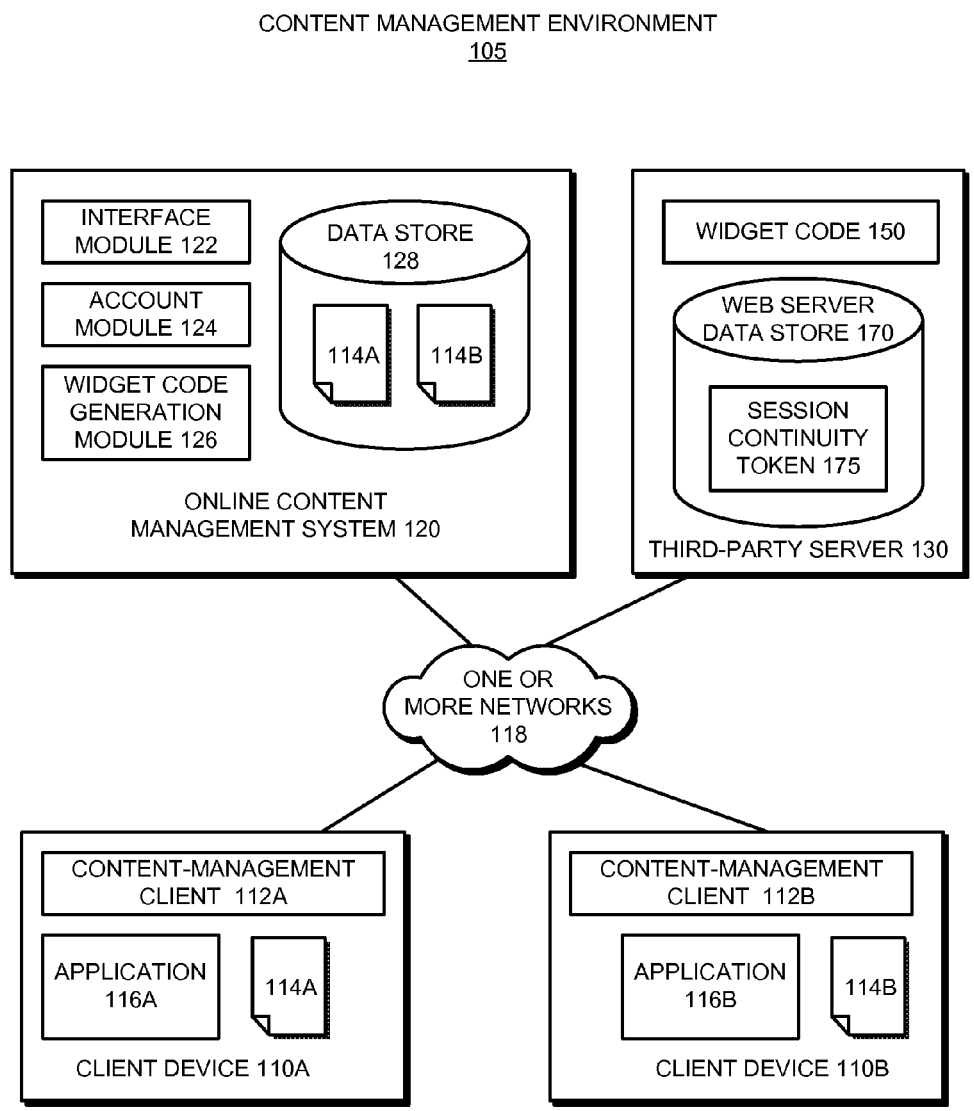
FIG. 1 shows a content management environment in accordance with the disclosed embodiments.

FIG. 1 illustrates content management environment 105 according to various embodiments. As may be understood from this figure, content management environment 105 includes a plurality of client devices 110A-110B (collectively 110), an online content management system 120 (also referred to as a "content management system"), and a third-party server 130, which are interconnected by one or more networks 118. Various aspects of the client devices 110 and online content management system 120 are discussed below.

Client Devices

In various embodiments, each client device 110 may selectively execute a content-management client application 112A-112B (collectively 112) (also referred to as a "content-management client"), which may be used to access content items stored within a content management system 120. In some embodiments, copies of content items 114A and 114B are maintained on client devices 110A and 110B, respectively, and synchronized copies of content items 114A and 114B are maintained on content management system 120. In some embodiments, client devices 110 may provide a file-browser type interface (not shown) for directly manipulating the content items stored on online content management system 120 without maintaining a local copy. Client devices 110 may also include applications 116A and 116B (collectively 116) for manipulating content items, such as content items 114A and 114B.

While only two client devices 110A and 110B are shown in FIG. 1 for purposes of clarity, it should be understood by those skilled in the art that many client devices 110 may simultaneously connect through network(s) 118 to content management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synced copy of one or more content items from within content management system 120, and the content items may be stored in any suitable file format. When content-management client 112 presents content items that are stored within the file storage system to a user, the content items may be arranged in folders and the folders themselves may be arranged in other folders, or in any other arbitrary arrangement supported by content management system 120, as determined by the user. However, one of skill in the art should understand in light of this disclosure that each user's file storage architecture may be considerably different from the next, and in some instances, the file storage architecture may be implemented to maximize storage and file retrieval efficiency.

Content Management System

Content management system 120 stores content items and manages access to those content items via client devices 110. Content management system 120 and its components may be implemented using any appropriate hardware and software for file serving, storage, and retrieval functions. For example, content management system 120 may be implemented in the form of a single server or multiple servers.

In various embodiments, content management system 120 includes interface module 122, data store 128, account module 124, and widget code generation module 126. Some of these elements of content management system 120 are discussed in more detail below.

Content Management System—Interface Module

In particular embodiments, interface module 122 may facilitate file access and file storage operations among content management system 120 and client devices 110. Interface module 122 may receive content items from and send content items to client devices 110 consistent with the user's preferences for sharing content items. Interface module 122 may act as the counterpart to a client-side file-explorer style user interface that allows a user to manipulate content items directly stored on content management system 120. In some embodiments, software operating on client devices 110 may integrate network-stored content items with the client's local file system to enable a user to manipulate network-stored content items through the same user interface (UI) used to manipulate content items on the local file system, e.g., via a file explorer, file finder or browser application. As an alternative or supplement to the client-side file-explorer interface, interface module 122 may provide a web interface for client devices 110 to access (e.g., via a suitable application 116) and allow a user to manipulate content items stored within content management system 120. In this way, the user can directly manipulate content items stored within content management system 120.

Content Management System—Data Store

In various embodiments, data store 128 may store content items such as those uploaded using client devices 110, or using any other suitable computing device. In the embodiment illustrated in FIG. 1, client device 110A, which is associated with a first user, is shown as locally storing at least one content item 114A, and client device 110B, which is associated with a second user, is shown as locally storing at least one content item 114B. As shown in FIG. 1, a copy of the locally stored content item 114A and a copy of locally stored content item 114B are maintained in data store 128 in content management system 120. In the embodiment illustrated in FIG. 1, content items 114A and 114B are synchronized content items that reside on client devices 110A-110B and online content management system 120. Note that client devices 110A-110B may also store other online content items that are replicated on online content management system 120, and which are shared with other client devices.

In various embodiments, data store 128 may maintain information identifying the user, information describing the user's file directory, and other information in a content item journal (also referred to as a "log") that is maintained for each user. In some embodiments, the content item journal may be maintained on content management system 120, and in other embodiments, a content item journal (e.g., a "server-side content item journal") may be maintained both on content management system 120 and locally on each client device 110. In various embodiments, the content item journal may be used to facilitate the synchronization of the various copies of a particular content item that are associated with a user's account.

As a particular example, in the embodiment shown in FIG. 1, the system may be configured so that any changes made to content item 114A on particular client device 110A may also be automatically reflected in the copy of content item 114A stored within online content management system 120. Similarly, any changes made to the copy of content item 114A on online content management system 120 may also be automatically reflected in the copy of content item 114A stored on client device 110A.

Content Management System—Account Module

In particular embodiments, account module 124 may track content items stored in data store 128 and entries in the server-side content item journal for each content item. As users grant content item access permissions to other users, account module 124 may update the server-side content item journal associated with each relevant user in data store 128. Account module 124 may also track client devices 110 that are associated with each user's account. For example, a user may want to share all their content items among their desktop computer, tablet computer, and mobile device. To make such a sharing arrangement seamless to the user, the user's single account on content management system 120 may be associated with each of the user's respective client devices. In some embodiments, an application running on each respective client device 110 may help to coordinate synchronization of content items on the client device with corresponding versions of the content items within the user's account in content management system 120, and also with corresponding versions of the content items stored on the user's various other client devices.

Content Management System—Widget Code Generation Module

In particular embodiments, widget code generation module 126 may be configured to generate code that may be used to create an email-attachment-upload widget on a remote email client. Note that while the description herein describes embodiments associated with a third-party email system, any type of system may be used with embodiments of the present invention, such as content management systems, project management systems, media applications, etc. In particular embodiments, this code may be HTML code that may be pasted into an email client to create the email-attachment-upload widget. In other embodiments, the code may be program code, which is integrated into a native-client-based email system. In particular embodiments, the email-attachment-upload widget may include a button that may be used to: (1) select one or more attachments from a user's email client; and (2) facilitate the upload of the selected attachments directly from the email client to an online content management system.

Third-Party Web Servers

In various embodiments, third-party server 130 comprises widget code 150 and web server data store 170. In these embodiments, widget code 150 is generated by widget code generation module 126 as described previously. Widget code 150 allows a user to access an online content management system 120 through different instances of a third-party application served by third-party server 130 located on different computing devices without having to log in to online content management system 120 separately from each computing device.

Process of Creating a Session Continuity Token

Figure 2:
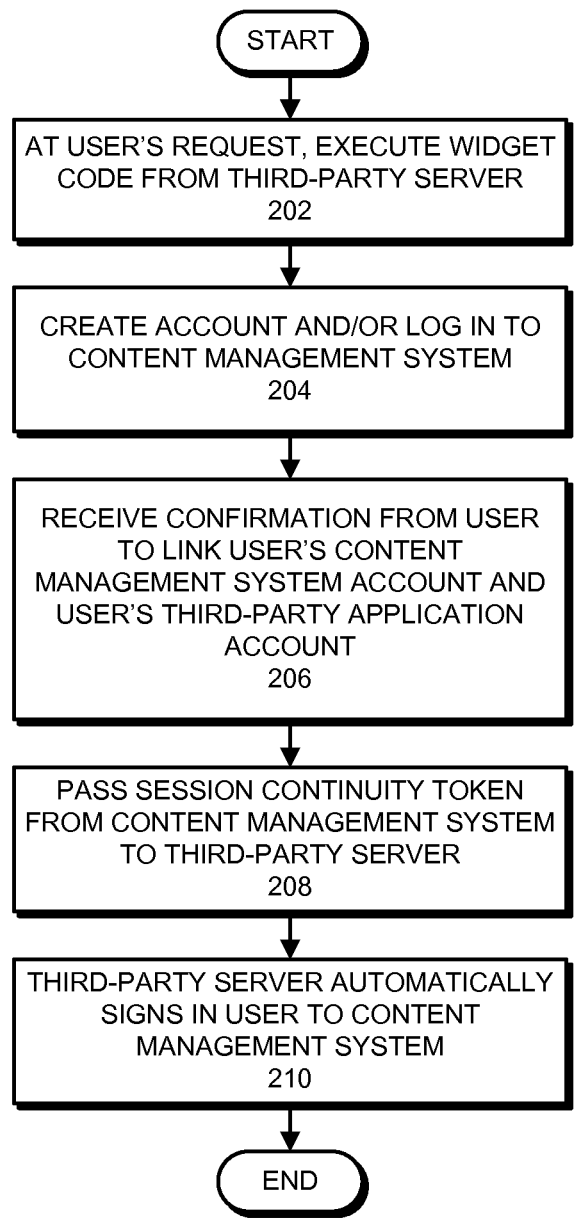
FIG. 2 shows a flow chart illustrating the process of creating a session continuity token in accordance with the disclosed embodiments.

FIG. 2 presents a flow chart illustrating the process of creating a session continuity token in accordance with the disclosed embodiments. During operation, at the user's request, the system executes widget code 150 from third-party server 130 while the user is using an application hosted by third-party server 130 (operation 202). Upon executing widget code 150, the system creates an account with online content management system 120 if necessary, and logs in to online content management system 120 (operation 204). Note that in different embodiments, the establishment of a session with online content management system 120 can be triggered by a number of different actions. For example, in some embodiments, establishment of a session with online content management system 120 is triggered when a user opens a dialog to save a monthly statement while using an online banking system; while in other embodiments, the establishment of the session is triggered when a user attempts to upload a picture to a social networking site. Moreover, the establishment of a session can also be triggered explicitly or implicitly.

Next, the system receives a confirmation from the user indicating that the user would like to link his or her online content management system 120 account with his or her third-party server 130 account (operation 206). Note that if an affirmative confirmation is not received, the system does not provide access to online content management system 120 without the user logging in to online content management system 120.

Once affirmative confirmation has been received, the system passes session continuity token 175 from online content management system 120 to third-party server 130 (operation 208). Note that session continuity token 175 enables third-party server 130 to access a set of services and/or content items from online content management system 120 without having to provide further identification or authentication credentials to online content management system 120. In some embodiments, the token is granted for an indefinite period of time, while in other embodiments, the token has a predetermined expiration time, or expires after a pre-determined amount of time has elapsed. Finally, the third-party server 130 automatically signs in the user to online content management system 120 (operation 210).

Note that session continuity token 175 can be comprised of various formats and types. For example, in some embodiments, the token may contain encrypted credentials, including instructions, that grant access to online content management system 120, while in other embodiments, session continuity token 175 may only be an identifier that identifies credentials stored within online content management system 120.

Process of Continuing a Session From a New Session Instance

Figure 3:
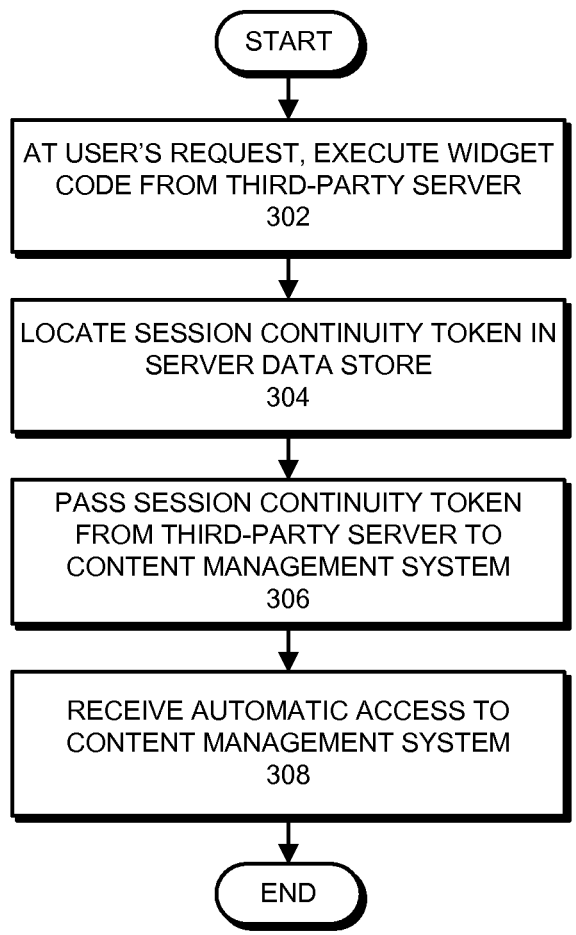
FIG. 3 shows a flow chart illustrating the process of continuing a session from a new session instance in accordance with the disclosed embodiments.

FIG. 3 presents a flow chart illustrating the process of continuing a session from a new session instance of the application hosted by third-party server 130 in accordance with the disclosed embodiments. Following on the process described with respect to FIG. 2, at a subsequent point in time, the user initiates a new session instance with third-party server 130. Note that, as described previously, embodiments of the present invention are not meant to be limited to use with third-party email systems. At some point during this new session instance, the user executes widget code 150 from third-party server 130 (operation 302). The system then locates the session continuity token 175 within web server data store 170 on third-party server 130 (operation 304). Once the session continuity token 175 is located, the system passes the session continuity token 175 from third-party server 130 to online content management system 120 (operation 306). Finally, in response to passing the session continuity token 175 to online content management system 120, the system receives automatic access to online content management system 120 at third-party server 130 (operation 308).

Note that in other embodiments, session continuity token 175 can be located and sent to new devices at a time other than when the user executes widget code 150. For example, the system may locate and send session continuity token 175 when the user logs in to third-party server 130, opens a window to compose a new message, or accesses account management dialogs.

As described previously, session continuity token 175 can include any level of authorization and authentication information to grant the user access to his or her account on online content management system 120. This access may include general access to the user's account, or include access only to specific files or operations. In some embodiments, this access is configurable by a user, while in other embodiments, this access is configurable by an administrator.

In some embodiments, session continuity token 175 may only be used to grant access to online content management system 120 from one third-party server at a time, while in other embodiments, the session continuity token 175 may allow for multiple connections to online content management system 120 from different third-party servers. Note that in some embodiments, session continuity token 175 includes advanced logic to prevent session hijacking and to prevent a stolen token from granting subsequent access to online content management system 120

Note that in many embodiments, access to online content management system 120 is only granted through the context of widget code 150. In some of these embodiments, the owners of online content management system 120 provide widget code 150 to the third party. Note that this can take place on demand, or may take place during a scheduled maintenance or downtime. In some embodiments, widget code 150 is generic code that works across many systems, while in other embodiments, widget code 150 is specific to a particular server or third-party. Also note that in many embodiments, the user may terminate the link between the user account at third-party server 130 and the user account at online content management system 120 at any time. Additionally, the third-party or the online content-management system may terminate the link. Deleting or revoking session continuity token 175 may accomplish this termination.

Note that in the situation where multiple session continuity tokens exist, the system may revoke all of the tokens at once, all of the tokens for a particular third-party, all of the tokens for a particular user, or only specific tokens.

Moreover, while the description herein describes web-based embodiments, embodiments of the present invention are not meant to be limited to web-based applications. For example, some embodiments are integrated into native clients, while other embodiments are integrated into mobile applications, while still other embodiments are integrated into platform-independent applications.

Exemplary Embodiment

The following description is associated with an exemplary embodiment that illustrates the process of accessing Dropbox™ through a session continuity token from multiple web-based email sessions. This session continuity token should be associated with the corresponding email account and stored by the email provider using a secure method. The email provider can utilize the user's session continuity token to provide access to the Dropbox™ embedded web content item selector running on other machines without requiring the user to separately log in to the Dropbox™ service, as set forth below.

First, at the user's request, the email provider opens the Dropbox™ embedded web content item selector (as described above). Next, the user signs into Dropbox™ or creates a new account. If this is the first time the user is using the Dropbox™ integration in the web-based email client, they are asked if they would like to link their Dropbox™ account with their email account. If they choose "yes," a session continuity token is created and is passed to the email provider, which is stored and associated with the current user's email account.

At some subsequent time, the user starts using a different browser to access the Dropbox™ integration in their web-based email. Note that, as described previously, the system may use a native client, or another means for accessing the Dropbox™ integration instead of using a web browser. The user's email provider passes the session continuity token to the Dropbox™ embedded web content item selector when it is accessed. Consequently, the user is automatically signed back into their Dropbox™ account, only within the Dropbox™ embedded web content item selector.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for allowing access to a content management system through different instances of an application, the method comprising:
   receiving, at a third-party server, a request from a third party application to access an account on a content management system;
   in response to the request, facilitating authentication between a user associated with the account and the content management system;
   sending a link request to the content management system to link an account at the third-party server with the account at the content management system;
   in response to the link request, receiving a session continuity token from the content management system at the third-party server;
   storing the session continuity token at the third-party server;
   receiving at the third party server a subsequent store request from a second instance of the third party application to store data located at the third party server to the content management system, wherein the second instance is also associated with the user and executes on at least one of a different browser or a different device than the first instance of the third party application;
   storing the data from the third party server to the account in the content management system, wherein the session continuity token is used to authenticate access to the account at the content management system;
   receiving, at the third-party server, a termination request to terminate access to the account at the content management system; and
   in response to the termination request, invalidating the session continuity token.

2. The computer-implemented method of claim 1, further comprising:
   wherein the third party application is an email application;
   wherein the email application includes an email specific storage widget that was received from the content management system;
   wherein receiving the request to access the account on the content management system involves receiving user input that activates the email specific storage widget; and
   wherein the subsequent store request stores an attachment from an email message in the second instance of the email application to the account in the content management system.

3. The computer-implemented method of claim 1, wherein facilitating authentication between the user and the content management system only occurs when the third-party server does not have a valid session continuity token.

4. The computer-implemented method of claim 1, wherein interaction with the content management system from the third-party application is handled by a widget executing within the third-party application.

5. The computer-implemented method of claim 4, wherein the widget comprises program code that is compiled with native code of the third-party application.

6. The computer-implemented method of claim 4, wherein the widget comprises HyperText Markup Language (HTML) code that is inserted into the third-party application.

7. The computer-implemented method of claim 6, wherein the HTML code is received from the content management system.

8. The computer-implemented method of claim 1, wherein the content management system is a online content management system.

9. A non-transitory computer-readable storage medium storing instructions that when executed by a computer cause the computer to perform a method for allowing access to a content management system through different instances of an application, the method comprising:
- receiving, at a third-party server, a request from a third-party application to access an account on a content management system;
- in response to the request, facilitating authentication between a user associated with the account and the content management system;
- sending a link request to the content management system to link an account at the third-party server with the account at the content management system;
- in response to the link request, receiving a session continuity token from the content management system at the third-party server;
- storing the session continuity token at the third-party server;
- receiving at the third party server a subsequent store request from a second instance of the third party application to store data located at the third party server to the content management system, wherein the second instance is also associated with the user and executes on at least one of a different browser or a different device than the first instance of the third party application;
- storing the data from the third party server to the account in the content management system, wherein the session continuity token is used to authenticate access to the account at the content management system;
- receiving, at the third-party application, a termination request to terminate access to the account at the content management system; and
- in response to the termination request, invalidating the session continuity token.

10. The non-transitory computer-readable storage medium of claim 9, wherein the method further comprises:
- wherein the third party application is an email application;
- wherein the email application includes an email specific storage widget that was received from the content management system;
- wherein receiving the request to access the account on the content management system involves receiving user input that activates the email specific storage widget; and
- wherein the subsequent store request stores an attachment from an email message in the second instance of the email application to the account in the content management system.

11. The non-transitory computer-readable storage medium of claim 9, wherein the method further comprises:
- in response to the termination request, replacing the session continuity token with a generic token that facilitates re-authentication upon subsequent access attempts.

12. The non-transitory computer-readable storage medium of claim 9:
- wherein interaction with the content management system from the third-party application is handled by a widget executing within the third-party application; and
- wherein the widget comprises platform-independent program code that is inserted into the third-party application.

13. The non-transitory computer-readable storage medium of claim 12, wherein the platform-independent code is received from a provider of the content management system.

14. The non-transitory computer-readable storage medium of claim 9, wherein the content management system is a web-enabled content management system.

15. An apparatus configured to allow access to a content management system through different instances of an application, comprising:
- a memory;
- a processor;
- wherein the memory and the processor collectively comprise:
  - a receiving mechanism configured to receive a request from a third party application to access an account on a content management system;
  - an authentication mechanism configured to facilitate authentication between a user associated with the account and the content management system in response to the request;
  - a sending mechanism configured to send a link request to the content management system to link an account at the third-party server with the account at the content management system;
  - wherein the receiving mechanism is further configured to receive a session continuity token from the content management system in response to the link request; and
  - a storage mechanism configured to store the session continuity token;
  - wherein the receiving mechanism is further configured to receive a subsequent store request from a second instance of the third party application to store data located in the storage mechanism to the content management system, wherein the second instance is also associated with the user and executes on at least one of a different browser or a different device than the first instance of the third party application; and
  - wherein the sending mechanism is further configured to send the data to be stored from the apparatus to the account in the content management system, wherein the session continuity token is used to authenticate access to the account at the content management system;
  - wherein the receiving mechanism is further configured to receive a termination request to terminate access to the account at the content management system; and
  - wherein the receiving mechanism is further configured to, in response to the termination request, invalidate the session continuity token.

16. The apparatus of claim 15, further comprising:
- the receiving mechanism further configured to receive, through a second instance of the third-party application, a new request to access the account at the content management system; and
- wherein the authentication mechanism is further configured to:
  - retrieve the session continuity token,
  - pass the session continuity token to the content management system, and
  - receive access to the account at the content management system, in response to the new request.

17. The apparatus of claim 15, further comprising:
- wherein the storage mechanism is configured to invalidate the session continuity token by deleting the session continuity token in response to the termination request.

18. The apparatus of claim 15, wherein interaction with the content management system from the third-party application is handled by an Application Programming Interface (API) call from the third-party application.

19. A computer-implemented method for allowing access to a content management system through different instances of an application, the method comprising:
    receiving, at a content management system from a third-party server, a request from a third party application to access an account on the content management system;
    in response to the request, facilitating authentication between a user associated with the account and the third-party server;
    receiving a link request at the content management system to link an account at the third-party server with the account at the content management system;
    in response to the link request, sending a session continuity token to the third-party server;
    receiving a subsequent request from the third party server to store data located at the third party server to the content management system, wherein the subsequent request is initiated in response to a store request initiated by a second instance of the third party application, wherein the second instance of the third party application executes on at least one of a different browser or a different device than the first instance of the third party application, wherein the subsequent request includes the data to be stored and the session continuity token;
    using the session continuity token to authenticate access to the account at the content management system; and
    storing the data from the third party server to the account;
    wherein the third party server subsequently receives a termination request to terminate access to the account at the content management system; and
    wherein, in response to the termination request, the third party server initiates the invalidation of the session continuity token.

20. The computer-implemented method of claim 19, further comprising:
    wherein the third party application is an email application;
    wherein the email application includes an email specific storage widget that was received from the content management system;
    wherein receiving the request to access the account on the content management system involves receiving user input that activates the email specific storage widget; and
    wherein the subsequent request stores an attachment from an email message in the second instance of the email application to the account.

21. A non-transitory computer-readable storage medium storing instructions that when executed by a computer cause the computer to perform a method for allowing access to a content management system through different instances of an application, the method comprising:
    receiving, at a content management system from a third-party server, a request from a third-party application to access an account on the content management system;
    in response to the request, facilitating authentication between a user associated with the account and the third-party server;
    receiving a link request at the content management system to link an account at the third-party server with the account at the content management system;
    in response to the link request, sending a session continuity token to the third-party server;
    receiving a subsequent request from the third party server to store data located at the third party server to the content management system, wherein the subsequent request is initiated in response to a store request initiated by a second instance of the third party application, wherein the second instance of the third party application executes on at least one of a different browser or a different device than the first instance of the third party application, wherein the subsequent request includes the data to be stored and the session continuity token;
    using the session continuity token to authenticate access to the account at the content management system; and
    storing the data from the third party server to the account at the content management system;
    wherein the third party application subsequently receives a termination request to terminate access to the account at the content management system; and
    wherein, in response to the termination request, the third party application initiates the invalidation of the session continuity token.

22. The non-transitory computer-readable storage medium of claim 21, further comprising:
    wherein the third party application is an email application;
    wherein the email application includes an email specific storage widget that was received from the content management system;
    wherein receiving the request to access the account on the content management system involves receiving user input that activates the email specific storage widget; and
    wherein the subsequent request stores an attachment from an email message in the second instance of the email application to the account.

23. An apparatus configured to allow access to a content management system through different instances of an application, comprising:
    a memory;
    a processor;
    wherein the memory and the processor collectively comprise:
        a receiving mechanism configured to receive, at a content management system from a third-party server, a request from a third party application to access an account on the content management system;
        an authentication mechanism configured to facilitate authentication between a user associated with the account and the third-party server in response to the request;
        wherein the receiving mechanism is further configured to receive a link request at the content management system to link an account at the third-party server with the account at the content management system; and
        a sending mechanism configured to send a session continuity token to the third-party server in response to the link request;
        wherein the receiving mechanism is further configured to receive a subsequent store request from the third party server to store data located at the third party server to the content management system, wherein the subsequent request is initiated in response to a store request initiated by a second instance of the third party application, wherein the second instance of the third party application executes on at least one of a different browser or a different device than the first instance of the third party application, wherein the subsequent request includes the data to be stored and the session continuity token;

wherein the authentication mechanism is further configured to use the session continuity token to authenticate access to the account at the content management system;

wherein the receiving mechanism is further configured to store the data from the third party server to the account at the content management system;

wherein the third party server subsequently receives a termination request to terminate access to the account at the content management system; and wherein, in response to the termination request, the third party server initiates the invalidation of the session continuity token.

24. The apparatus of claim 23, further comprising:

wherein the third party application is an email application;

wherein the email application includes an email specific storage widget that was received from the content management system;

wherein receiving the request to access the account on the content management system involves receiving user input that activates the email specific storage widget; and wherein the subsequent request stores an attachment from an email message in the second instance of the email application to the account.

* * * * *